Patented Dec. 27, 1938

2,141,985

UNITED STATES PATENT OFFICE 2,141,985

MANUFACTURE OF ESTERS OF SALICYLIC ACID

Walter Edward Huggett, Ilford, England

No Drawing. Application June 2, 1937, Serial No. 146,115. In Great Britain June 24, 1936

7 Claims. (Cl. 260—474)

According to this invention esters of salicylic acid with phenols are prepared by causing a salicylic ester of an alcohol of low boiling point such as methyl alcohol or ethyl alcohol to react with a phenol in presence of a catalyst.

The term "a phenol" as used herein throughout denotes phenol and homologues of phenol; thymol and isothymol may be cited by way of examples.

The catalyst I employ is selected from the group consisting of the alkali metal phenates and alkaline earth metal phenates. It may be prepared in situ in the reaction mixtures or it may be prepared in a separate operation.

Thus a sodium phenate may be cited by way of example. The catalyst may be provided by dissolving the requisite quantity of an alkali metal in the mixture of the phenol and salicylic ester used as starting material. Alternatively it may be prepared separately by the action of an alkali metal on a phenolic compound, especially, for instance, on the phenol or the salicylic ester used as starting material or on the salicylic ester which is to form the product of the reaction. In preparing the catalyst a caustic alkali or an alkaline earth oxide or hydroxide may conveniently be used instead of the metal, provided that the catalyst is dried before use to remove water formed in its production; when the catalyst contains an ester group care must be taken during drying to avoid conditions which would cause saponification. The catalyst may consist of a mixture of several alkali metal phenates.

The quantity of catalyst need amount only to a few per cent. such as 2–5 per cent. of the reaction mixture.

In a preferred form of carrying out the invention the mixture is maintained at a temperature such that the low boiling alcohol liberated in the reaction is continuously distilled from the reaction mixture. An excess of the phenol is preferably used in order to avoid reactions of condensation of the salicylic esters. For a like reason it is advisable to interrupt the reaction when only about 60 per cent. of the parent salicylic ester has undergone conversion into the phenol ester. The catalyst is then removed by washing or by destruction, for instance by decomposition by means of acid and the unchanged reactants expelled by distillation under reduced pressure; they may be used in a subsequent batch.

The invention provides a convenient method of preparing esters of salicylic acid with phenol and its homologues. Nearly quantitative yields of ester can be obtained by interrupting the reaction as described above and causing the unreacted salicylic ester and phenol recovered by a fractional distillation to further react together in presence of catalyst, if necessary the operation being repeated. Low boiling alcohol liberated in the reaction can be recovered and the only auxiliary materials which need be consumed are the materials used in preparing the catalyst and the agents used for destroying it, for instance the caustic alakli or alkaline earth used in preparing the catalyst and the acid used for decomposing it after reaction has taken place.

The following examples illustrate the invention, the parts being by weight:—

Example 1

To a mixture of 124 parts of phenol and 100 parts of methyl salicylate, previously dried, preferably by boiling off any trace of moisture, are added 0.33 part of metallic sodium which at once commences to dissolve with evolution of hydrogen. Without waiting for complete solution the mixture is heated until it boils gently. Thereupon methyl alcohol is liberated and is continuously removed by distillation through a rectifying column. After 5 hours when 11 parts of methyl alcohol have distilled off, the reaction is stopped, the mixture washed with water to remove sodium salts, and then distilled.

75 parts of a fraction boiling at 145–157° C. at 4 mm. pressure are obtained; this crystallizes out to a product of melting point 35° C. No by-products are formed and the rest of the distillate is a mixture of phenol and methyl salicylate which can be treated to yield a further amount of the ester.

The methyl salicylate used in this example can be replaced by ethyl salicylate.

Example 2

The sodium phenate of salicylic acid methyl ester is prepared by reacting together molecular proportions of caustic soda and methyl salicylate in alcohol, filtering and drying the precipitate. 5 parts of this sodium salt are used as a catalyst with a mixture of 100 parts of phenol and 60 parts of methyl salicylate which has been previously dried. Reaction is commenced as in the previous example and after one hour 7 parts of methyl alcohol have distilled off. The sodium salt is then decomposed by adding the calculated amount of concentrated hydrochloric acid, and the mixture distilled under a vacuum of 4 mm. 40 parts of phenyl salicylate of melting point 36° C., and 121 parts of phenol-methyl salicylate mixture are obtained by this distillation, no by-products being formed.

To this 121 parts of unreacted mixture a further 2.5 parts of the sodium phenate of salicylic acid methyl ester are added and reaction initiated as above. 5.5 parts of methyl alcohol are first obtained and on distillation a further 28 parts of phenyl salicylate. The first runnings of the distillation on still further reaction in presence of the catalyst and subsequent distillation yield 10 parts of the phenyl ester and a final recovery of 60 parts of phenol. The total yield of phenyl salicylate is thus 92 per cent. of that theoretically obtainable and 95 per cent. of the excess phenol is also recovered. The crude product so obtained having a melting point 35–36° C. is readily purified by one crystallization from a solvent, for instance alcohol, giving a product of melting point 42° C.

*Example 3*

5 parts of sodium phenate of salicylic acid methyl ester are added to a mixture of 100 parts of thymol and 51 parts of methyl salicylate and the mixture gently boiled. 6 parts of methyl alcohol distil off in 1 hour and the mixture is thereupon treated with hydrochloric acid as in Example 2 and distilled.

The fraction boiling at 170–195° C. at 2 mm. pressure is separated and yields 38 parts of thymyl salicylate.

By using in this example in place of thymol the so-called "iso-thymol oil" there is obtained an oily ester boiling at approximately 180° C. at 2 mm. pressure.

Having thus described the nature of the said invention and the best means I know of carrying the same into practical effect, I claim:—

1. A method of preparing esters of salicylic acid with phenols which comprises heating a salicylic ester of an alcohol of low boiling point together with a phenol in presence of a catalyst selected from the group consisting of the alkali metal phenates and alkaline earth metal phenates, and distilling off the said low-boiling alcohol as it is formed during the reaction.

2. A method of preparing esters of salicylic acid with phenols which comprises heating a salicylic ester of an alcohol of low boiling point together with a phenol in presence of a catalyst selected from the group consisting of the alkali metal phenates and alkaline earth metal phenates, distilling off the said low-boiling alcohol as it is formed during the reaction, thereafter removing the said catalyst and subjecting the mixture to a fractional distillation.

3. A method of preparing esters of salicylic acid with phenols which comprises heating a salicylic ester of an alcohol of low boiling point together with a phenol after addition of an alkali metal to the mixture, distilling off the low-boiling alcohol as it is formed during the reaction, thereafter removing the alkali metal phenate present in the mixture and subjecting the mixture to a fractional distillation.

4. A method of preparing phenylsalicylate by heating together excess phenol and an alkylsalicylate selected from the group consisting of methyl- and ethyl-salicylate after adding metallic sodium, distilling off the alcohol as it is formed during the reaction, washing the mixture to remove sodium salts and subjecting it to a fractional distillation.

5. A method of preparing phenylsalicylate by heating methylsalicylate and phenol together in presence of the sodium phenate of salicylic acid methyl ester, distilling off the methyl alcohol as it is formed during the reaction, adding sufficient acid to decompose the said sodium salt, and subjecting the mixture to a fractional distillation.

6. A method of preparing thymylsalicylate by heating methylsalicylate and thymol together in presence of the sodium phenate of salicylic acid methyl ester, distilling off the methyl alcohol as it is formed during the reaction, decomposing the said sodium salt by adding sufficient acid, and subjecting the mixture to a fractional distillation.

7. A method of preparing isothymylsalicylate by causing methylsalicylate to react with iso-thymol oil in presence of the sodium phenate of salicylic acid methyl ester, distilling off the methyl alcohol as it is formed during the reaction, decomposing the said sodium salt by adding sufficient acid, and subjecting the mixture to a fractional distillation.

WALTER EDWARD HUGGETT.